(12) United States Patent
Tajiri

(10) Patent No.: US 7,864,253 B2
(45) Date of Patent: Jan. 4, 2011

(54) IMAGE DISPLAY AND ELECTRONIC DEVICE

(75) Inventor: Kenichi Tajiri, Shiojiri (JP)

(73) Assignee: Sony Corporation, Tokyo (JP)

( * ) Notice: Subject to any disclaimer, the term of this patent is extended or adjusted under 35 U.S.C. 154(b) by 1035 days.

(21) Appl. No.: 11/620,257

(22) Filed: Jan. 5, 2007

(65) Prior Publication Data

US 2007/0164950 A1 Jul. 19, 2007

(30) Foreign Application Priority Data

Jan. 19, 2006 (JP) ............................. 2006-011304

(51) Int. Cl.
*G02F 1/1335* (2006.01)
(52) U.S. Cl. ....................................... 349/15
(58) Field of Classification Search ........................ None
See application file for complete search history.

(56) References Cited

U.S. PATENT DOCUMENTS 5,969,850 A 10/1999 Harrold et al.

2002/0027632 A1 * 3/2002 Aratani et al. .............. 349/138
2006/0082519 A1 * 4/2006 Nam et al. ..................... 345/9

FOREIGN PATENT DOCUMENTS

JP 10-142572 5/1998

* cited by examiner

*Primary Examiner*—David Nelms
*Assistant Examiner*—Lucy P Chien
(74) *Attorney, Agent, or Firm*—K&L Gates LLP

(57) ABSTRACT

An image display includes the following components. A display panel has a plurality of pixels arrayed in a first direction and a second direction intersecting the first direction. A light source emits light toward the display panel. A polarization-axis control unit separates the light emitted from the light source into light having a first polarization axis and light having a second polarization axis. An optical element allows the light emitted from the light source to travel in a direction substantially orthogonal to the first direction. The polarization-axis control unit includes a first substrate, a second substrate, a liquid crystal layer sandwiched between the first and second substrates, a first electrode, a second electrode, and a third electrode. The third electrode is superposed over the first electrode and the second electrode in a region corresponding to a pixel array area of the display panel.

4 Claims, 13 Drawing Sheets

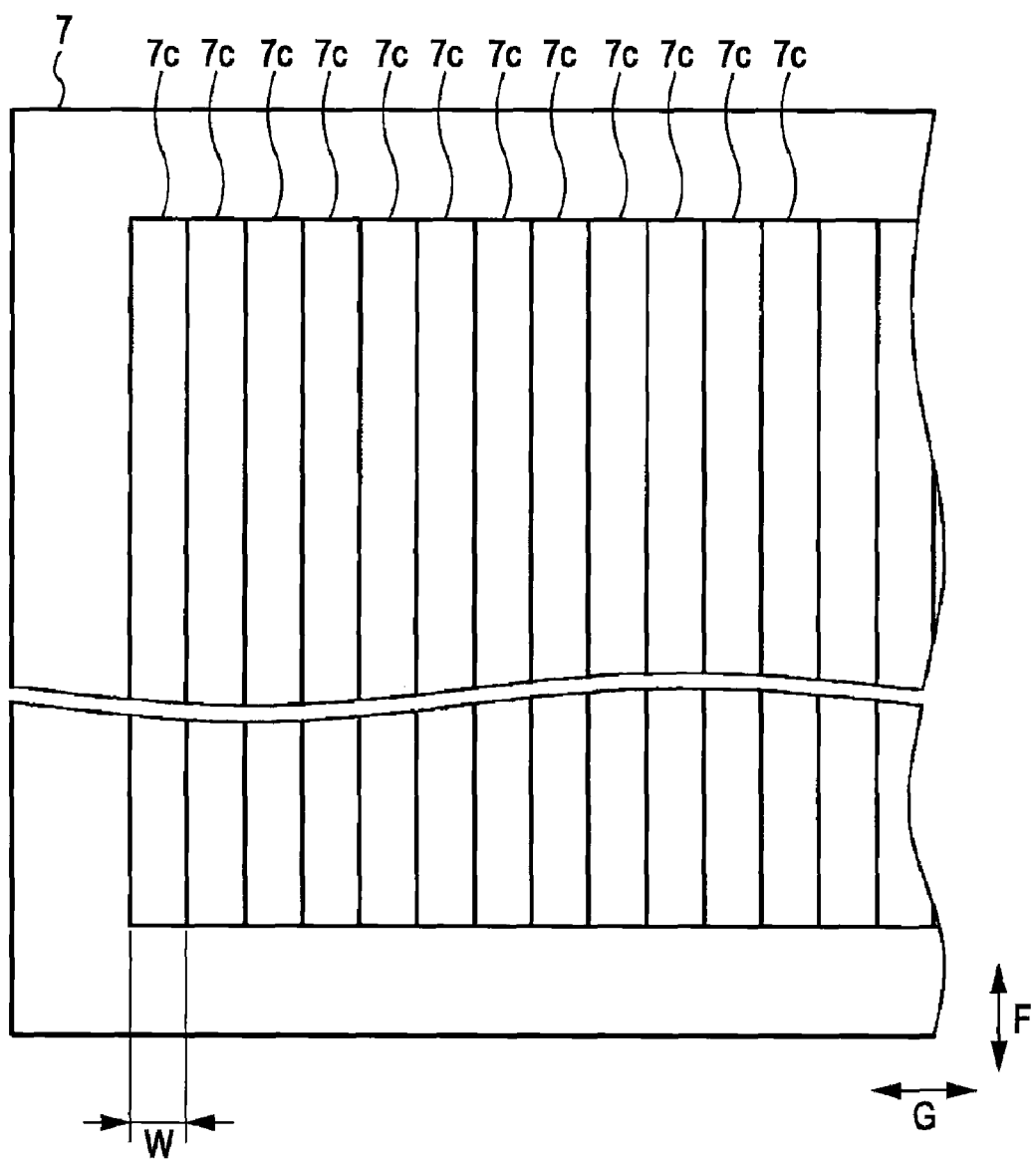

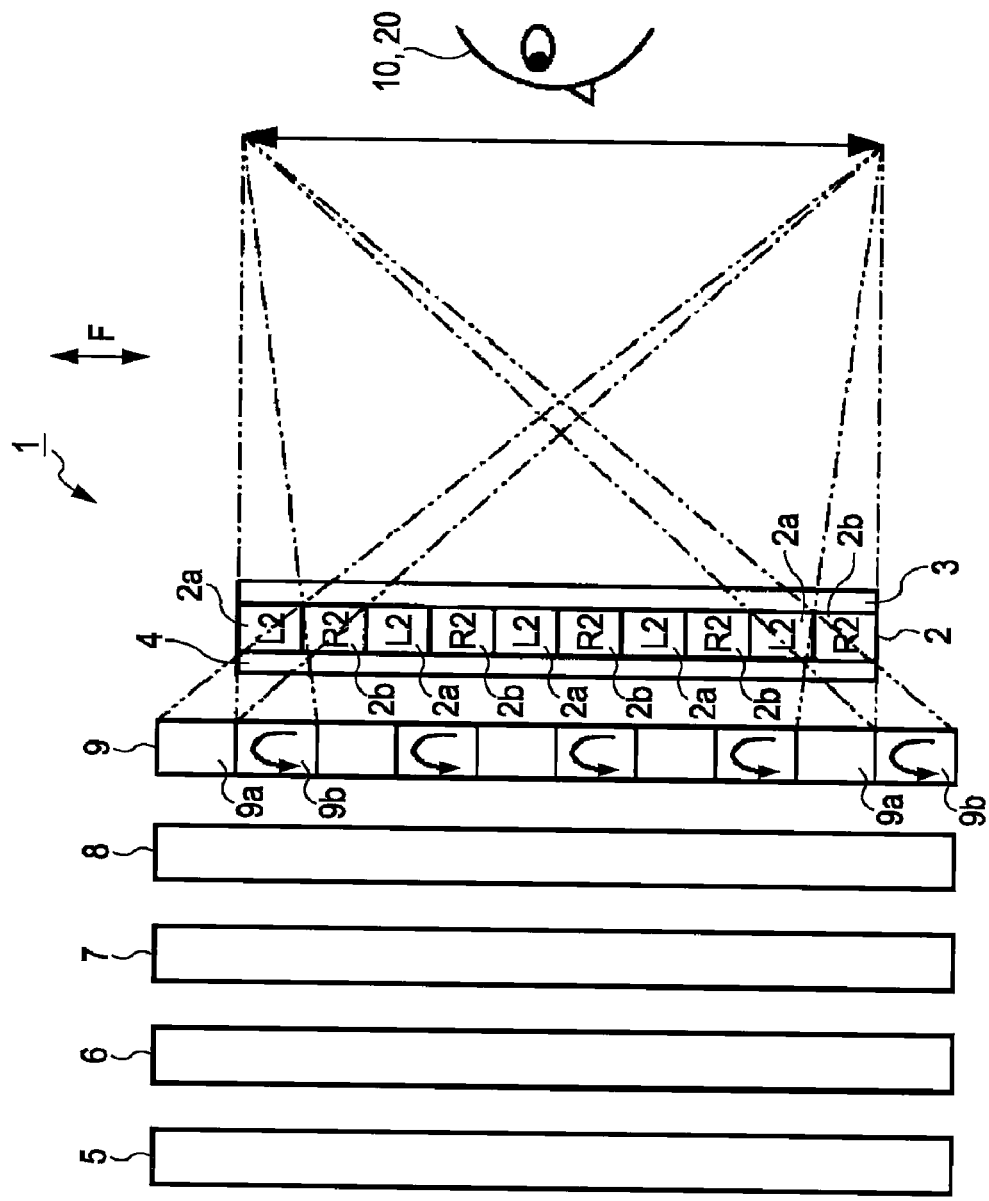

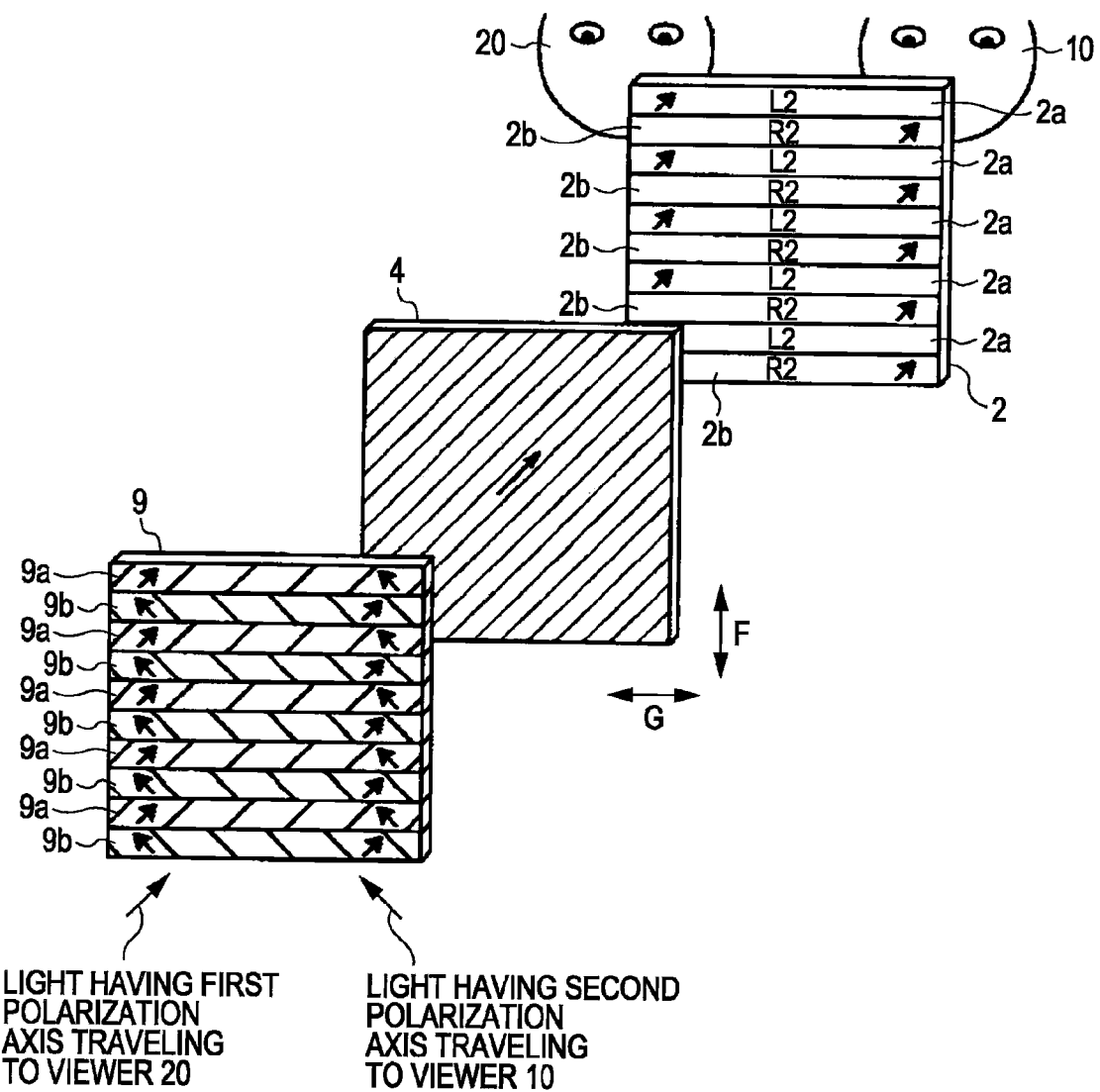

IMAGE DISPLAY AND ELECTRONIC DEVICE

BACKGROUND

1. Technical Field

The present invention relates to image displays and electronic devices, and in particular, relates to an image display having a polarization-axis control unit and an electronic device having the image display.

2. Related Art

As one of image displays for displaying a three-dimensional stereoscopic image, a three-dimensional image display disclosed in Japanese Patent No. 2,857,429 is known. In this three-dimensional image display, a controller, such as a microcomputer, controls an electronic parallax barrier disposed on one side of a screen facing to a viewer to form light-transmitting portions and light-shielding portions in the parallax barrier so that the viewer sees left-eye and right-eye images with their left and right eyes, respectively.

In other words, the image display using the parallax barrier presents different images to the left and right eyes of the viewer, thus allowing the viewer to perceive the different images as a stereoscopic image.

The displays using the above-described parallax barrier include a known dual-view display that displays different images in different directions to present the different images to different viewers.

In the dual-view display using the parallax barrier, since the parallax barrier is disposed on one side of a screen facing to viewers, light coming from the screen is partially shielded by light-shielding portions of the parallax barrier. This leads to a reduction in the brightness of each image viewed by the corresponding viewer. Unfortunately, the image appears dark.

SUMMARY

An advantage of some aspects of the invention is to provide an image display for enabling dual-view display without reducing the brightness of an image viewed by each viewer.

According to an aspect of the invention, there is provided an image display including the following components: A display panel has a plurality of pixels arrayed in a first direction and a second direction intersecting the first direction. A light source emits light toward the display panel. A polarization-axis control unit is disposed between the display panel and the light source. The polarization-axis control unit separates the light emitted from the light source into light having a first polarization axis and light having a second polarization axis different from the first polarization axis. An optical element is arranged between the display panel and the polarization-axis control unit. The optical element allows the light emitted from the light source to travel in a direction substantially orthogonal to the first direction. The polarization-axis control unit includes a first substrate, a second substrate, a liquid crystal layer sandwiched between the first and second substrates, a plurality of first electrodes extending in the first direction arranged at a predetermined pitch in the second direction on the first substrate, and a second electrode on the second substrate. The first electrodes each having a connecting part and a plurality of strip electrode segments extending from the connecting part are arranged in such a manner that the respective connecting parts are arranged in opposite end portions of the first substrate and the strip electrode segments are alternately arranged over a surface of the first substrate. The second electrode is superposed over the first electrodes in a region corresponding to a pixel array area of the display panel.

With these arrangements, the optical element allows the lights having the first and second polarization axes separated through the polarization-axis control unit to travel to viewers in two directions which are substantially orthogonal to the first direction. Accordingly, the lights traveling to the viewers are not blocked, thus preventing the intensities of the lights traveling to the viewers from decreasing. Advantageously, images can be prevented from appearing dark. Furthermore, with these arrangements, the first electrodes can be formed by a single conductive layer on the substrate. The polarization-axis control unit can be easily formed at a low cost.

According to this aspect of the invention, it is preferable that the image display further include a controller that controls voltages applied to the first and second electrodes to switch an image display mode of the image display between a first dual-view display mode and a second dual-view display mode.

With these arrangements, images provided to viewers in different viewing positions can be interchanged without changing positions of display portions for the images. Advantageously, image processing is not needed. A delay in image display is not caused during interchanging the images.

According to this aspect of the invention, preferably, in the first dual-view display mode, the controller applies the voltages to the first and second electrodes so that the adjacent electrode segments of the respective first electrodes are opposite in phase and the second electrode is applied with the voltage having the same phase as that of one of the voltages applied to the first electrodes, and in the second dual-view display mode, the controller applies the voltages to the first and second electrodes so that the adjacent electrode segments of the respective first electrodes are opposite in phase and the second electrode is applied with the voltage having the same phase as that of the other voltage.

With these arrangements, the controller can be composed of known simple electric circuits. Advantageously, the controller can be readily formed at a low cost.

According to another aspect of the invention, there is provided an electronic device having the above-described image display.

According to those aspects of the invention, dual-view display can be performed without reducing the brightness of an image viewed by each viewer.

BRIEF DESCRIPTION OF THE DRAWINGS

The invention will be described with reference to the accompanying drawings, wherein like numbers reference like elements.

FIG. 3 is a partially enlarged view of a polarization control liquid crystal display panel.

FIG. 9 is a diagram showing a state where the viewer located in front of the image display views the display panel, FIG. 9 explaining the principle of the image display.

FIGS. 10A and 10B are exploded perspective views for explaining the principle of the image display.

DESCRIPTION OF EXEMPLARY EMBODIMENTS

Figure 1:
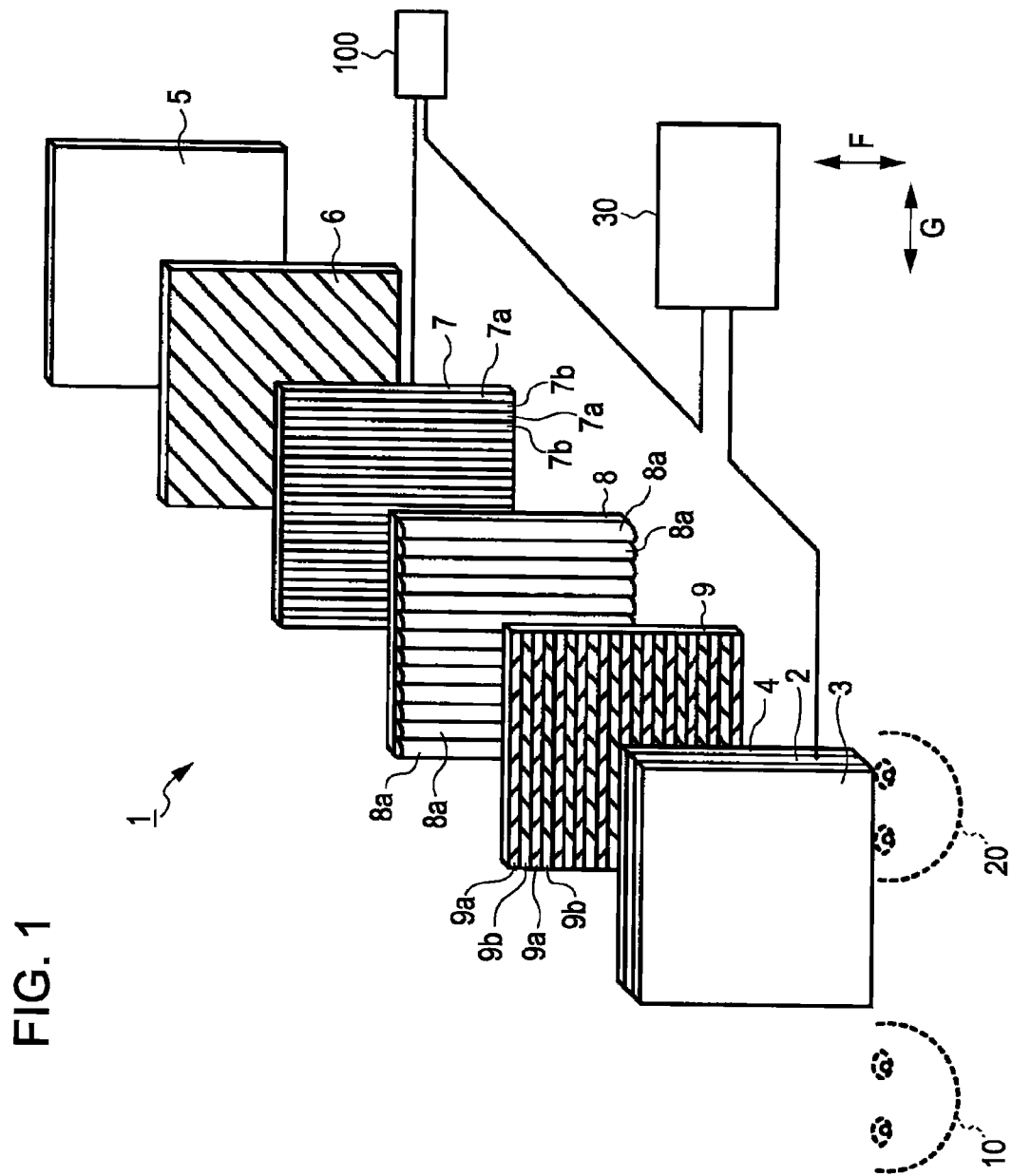
FIG. 1 is an exploded perspective view of an image display according to an embodiment of the invention.
Figure 2A:
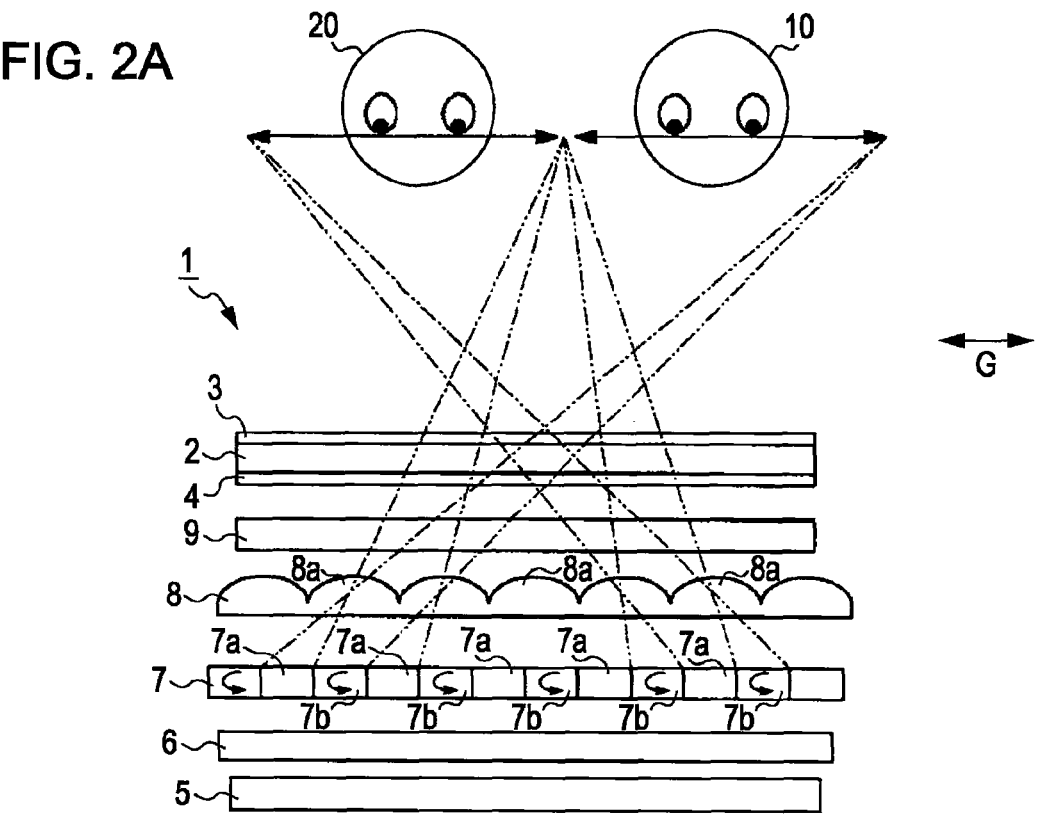
FIGS. 2A and 2B are diagram showing states where viewers located in front of the image display view a display panel, the diagrams explaining the principle of the image display.
Figure 2B:
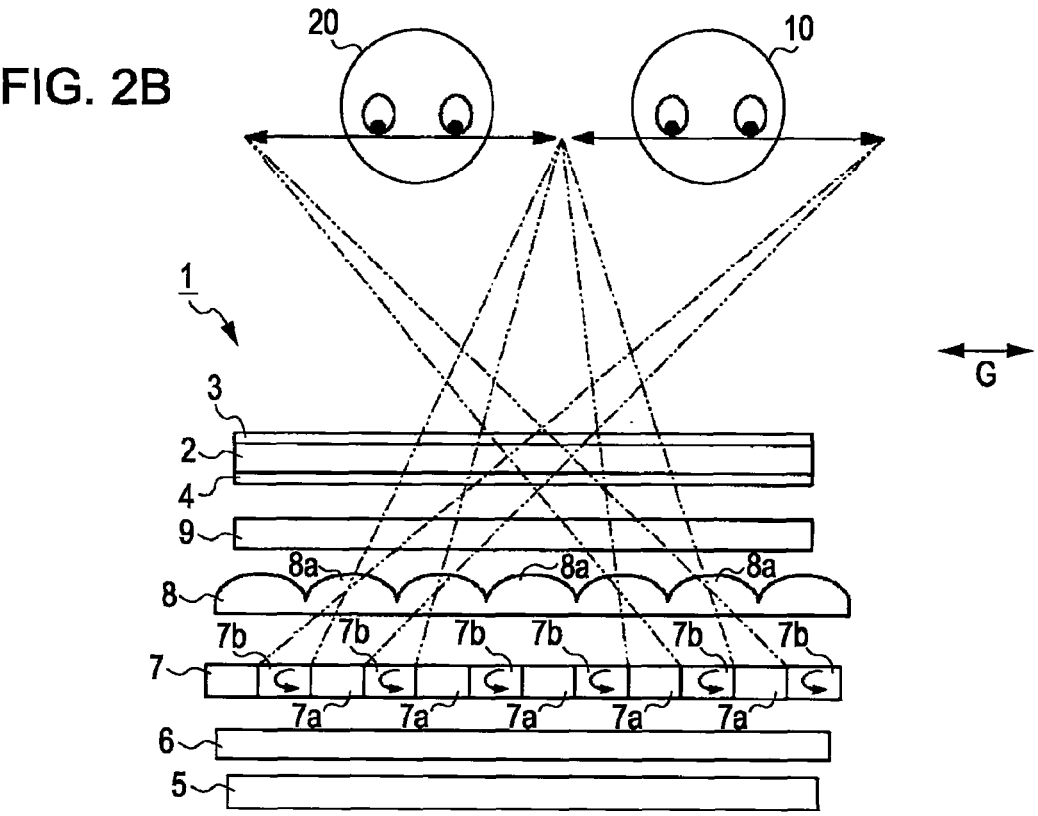

Embodiments of the invention will be described below with reference to the drawings. FIG. 1 is an exploded perspective view of an image display according to an embodiment of the invention. FIGS. 2A and 2B are diagrams showing states where viewers located in front of the image display view a display panel, the diagrams explaining the principle of the image display. FIG. 3 is a partially enlarged view of a polarization control liquid crystal panel of the image display shown in FIG. 1.

Referring to FIG. 1, an image display 1 according to the present embodiment presents different images L2 and R2 to different viewers 10 and 20 located in different viewing positions. Hereinafter, such a state of the image display 1 will be called a dual-view display mode. The image display 1 according to this embodiment has a first dual-view display mode and a second dual-view display mode. In the first dual-view display mode, the image display 1 presents the image L2 to the viewer 10 and simultaneously presents the image R2 to the viewer 20. In the second dual-view display mode, the image display 1 presents the image R2 to the viewer 10 and simultaneously presents the image L2 to the viewer 20.

The structure of the image display 1 according to the embodiment of the invention will now be described. Referring to FIGS. 1 to 2B, the image display 1 includes a display panel 2 for image display, polarizers 3 and 4 disposed with the display panel 2 therebetween, a backlight serving as a light source emitting light toward the display panel 2, and a polarizer 6 arranged on one side of the backlight 5 near to the viewers 10 and 20 (refer to FIGS. 2A and 2B). The polarizers 3 and 4, which sandwich the display panel 2 therebetween, have polarization axes orthogonal to each other. The polarizer 4 transmits light having a first polarization axis and absorbs light having a second polarization axis that is substantially orthogonal to the first polarization axis. The polarizer 3 transmits light having the second polarization axis and absorbs light having the first polarization axis. The combination of the display panel 2 and the polarizers 3 and 4 provides a so-called transmissive liquid crystal display (LCD) panel which has a matrix of pixels arranged in first and second directions shown by arrows F and G, respectively. The direction F (first direction) is orthogonal to the direction G (second direction). The polarizer 6 transmits light having the first polarization axis of lights emitted from the backlight 5. The display panel 2 is connected to a controller 30. In response to an image signal supplied from the controller 30, the display panel 2 changes optical characteristics of each pixel to perform image display. The controller 30 renders data of the images L2 and R2 to be supplied to the image display 1 to generate image signals.

The controller 30 is electrically connected to a driving circuit 100 of a polarization control liquid crystal display (LCD) panel 7, which will be described below. The controller 30 is connected to a display mode selector switch (not shown). In response to an operation on the display mode selector switch by the viewer 10 or 20, the controller 30 outputs a switching signal to the driving circuit 100. The controller 30 may be disposed outside the image display 1.

On one side of the polarizer 6 near to the viewers 10 and 20, the polarization control LCD panel 7 is arranged. Referring to FIG. 3, the polarization control LCD panel 7, including two transparent substrates and a liquid crystal layer arranged therebetween, has a plurality of strip-shaped unit areas 7c each having a predetermined width W and extending in the direction F. In other words, the unit areas 7c are arranged at a predetermined pitch W in the direction G. The polarization control LCD panel 7 is connected to the driving circuit 100. In response to a signal supplied from the driving circuit 100, the orientation of liquid crystal molecules in each unit area 7c is changed, thus switching the unit area 7c between a transmitting state and a polarizing state. In the transmitting state, light having the first polarization axis is transmitted. In the polarizing state, light having the first polarization axis is converted to light having the second polarization axis that is substantially orthogonal to the first polarization axis. The driving circuit 100 is connected to the controller 30. The driving circuit 100 controls the states of the unit areas 7c in accordance with a switching signal supplied from the controller 30.

Referring to FIG. 1, the polarization control LCD panel 7 sets the unit areas 7c to be alternately in the transmitting and polarizing states, thus providing polarization control areas 7a for transmitting light having the first polarization axis emitted from the backlight 5 through the polarizer 6 and polarization control areas 7b for converting light having the first polarization axis to light having the second polarization axis substantially orthogonal to the first polarization axis. The polarization control areas 7a and 7b of the polarization control LCD panel 7 extend in a direction substantially orthogonal to a line segment connecting the viewers 10 and 20, i.e., in the direction perpendicular to the drawing sheet of each of FIGS. 2A and 2B (in the direction F in FIG. 1). The polarization control areas 7a and 7b are alternately arranged in the direction G.

In the first dual-view display mode of the image display 1, the polarization control LCD panel 7 is controlled so as to set the unit areas 7c alternately in the transmitting and polarizing states to provide the polarization control areas 7a and 7b as shown in FIG. 2A. In the second dual-view display mode, the polarization control LCD panel 7 is controlled so as to reverse the positional relationship between the polarization control areas 7a and 7b in the first dual-view display mode, as shown in FIG. 2B.

Referring to FIGS. 1 to 2B, a lenticular lens 8 is arranged on one side of the polarization control LCD panel 7 near to the viewers 10 and 20. The lenticular lens 8 includes a plurality of substantially semicylindrical lens portions 8a extending in the direction F of FIG. 1. Referring to FIGS. 2A and 2B, each lens portion 8a corresponds to one combination of the polarization control areas 7a and 7b in the polarization control LCD panel 7. The lenticular lens 8 including the lens portions 8a allows lights having the different polarization axes separated through the polarization control LCD panel 7 to travel in two directions substantially orthogonal to the direction F, i.e., to the viewers 10 and 20 located in the different viewing positions.

For example, in the first dual-view display mode of the image display 1 shown in FIG. 2A, light rays coming from the polarization control areas 7a are focused so as to travel to the viewer 10 by the lenticular lens 8. On the other hand, light rays coming from the polarization control areas 7b are focused so as to travel to the viewer 20 by the lenticular lens 8.

In the second dual-view display mode of the image display 1 shown in FIG. 2B, light rays coming from the polarization control areas 7b are focused so as to travel to the viewer 10 by the lenticular lens 8. On the other hand, light rays coming from the polarization control areas 7a are focused so as to travel to the viewer 20 by the lenticular lens 8.

Figure 10A:
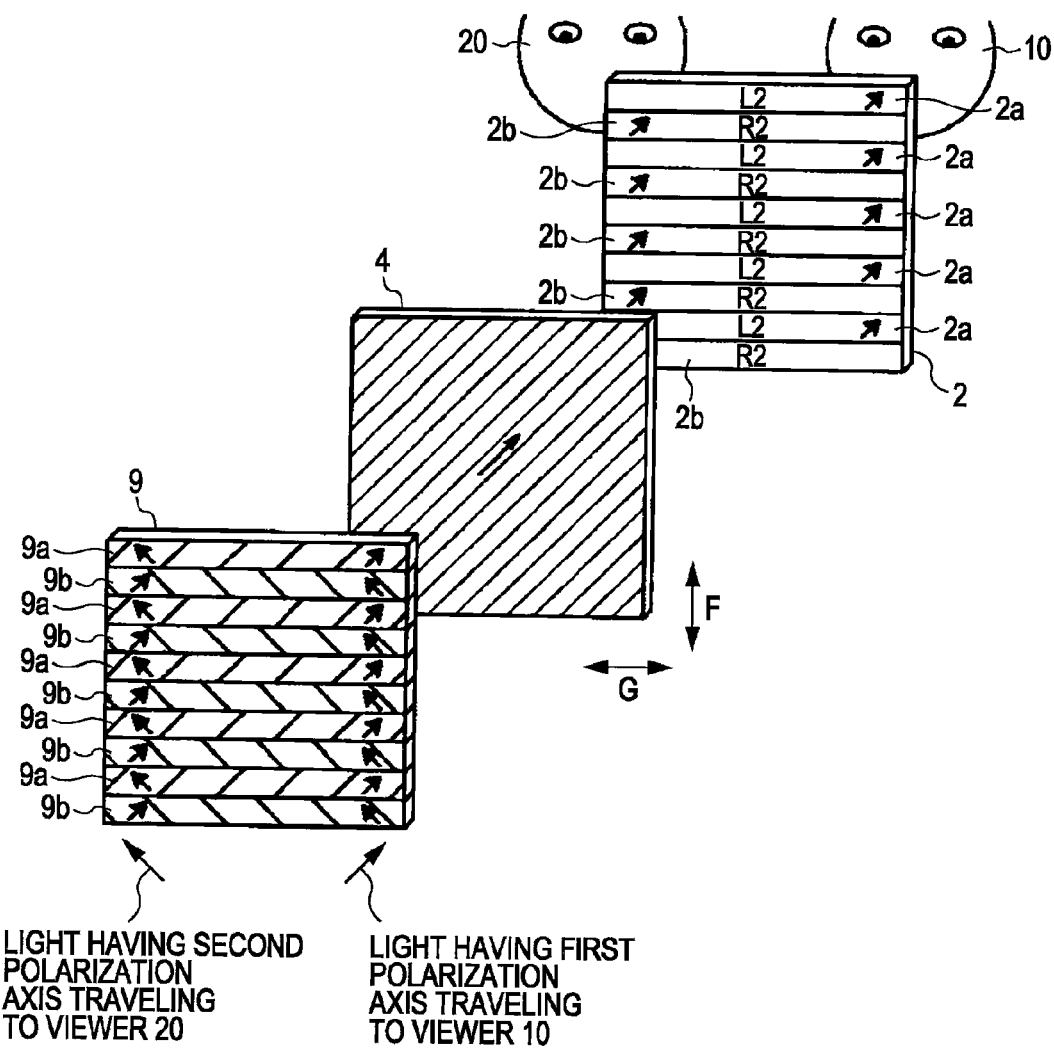

In addition, a retardation film 9 is arranged between the lenticular lens 8 and the polarizer 4 attached on the display panel 2. FIG. 9 is a diagram showing a state where the viewer positioned in front of the image display 1 views the display panel 2, the diagram explaining the principle of the image display 1 in FIG. 1. FIGS. 10A and 10B are exploded perspective views of the image display 1 shown in FIG. 1 for explanation of the principle thereof. The retardation film 9 includes transmitting areas 9a for transmitting light having the first polarization axis and polarizing areas 9b for converting light having the first polarization axis to light having the second polarization axis. Referring to FIGS. 1 and 10A and 10B, the transmitting areas 9a and the polarizing areas 9b extend in the direction G substantially orthogonal to the direction F such that they are alternately arranged in the direction F. As shown in FIGS. 9 to 10B, the transmitting areas 9a and the polarizing areas 9b of the retardation film 9 are arranged so as to correspond to respective rows of pixels (hereinafter, pixel rows 2a and 2b) in the display panel 2, the pixel rows 2a and 2b extending in the direction G and being alternately arranged in the direction F.

Figure 4:
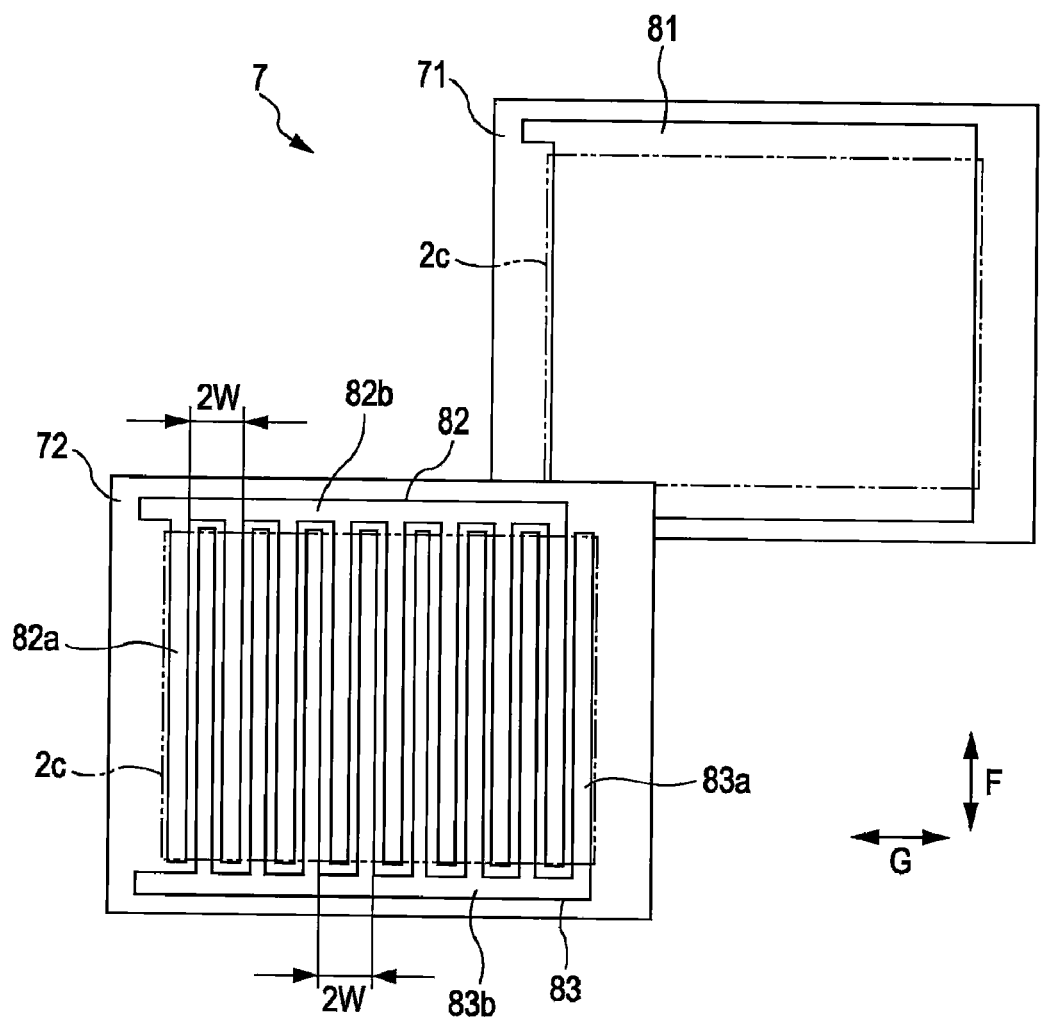
FIG. 4 is an exploded perspective view of the polarization control liquid crystal display panel.
Figure 5:
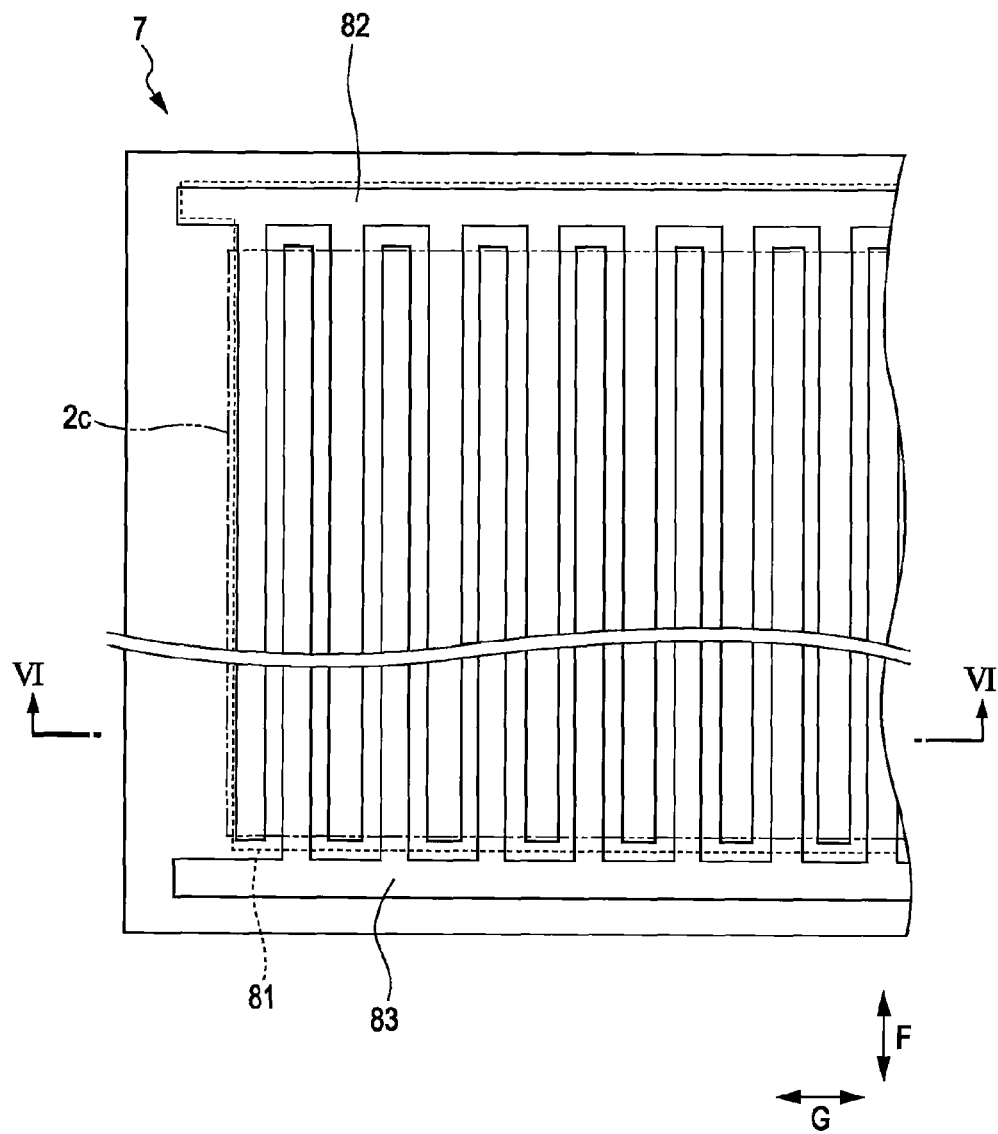
FIG. 5 is a plan view of the polarization control liquid crystal display panel.
Figure 6:
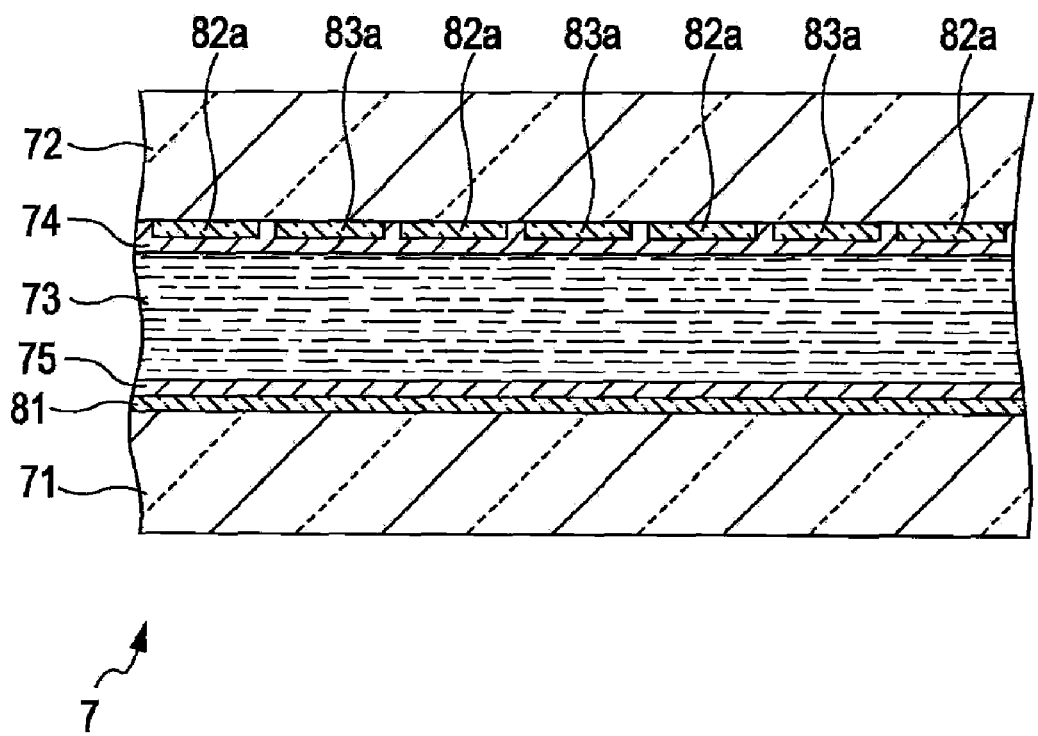
FIG. 6 is a cross-sectional view at the line VI-VI of FIG. 5.

The structure of the polarization control LCD panel 7 will now be described in detail below. FIG. 4 is an exploded perspective view of the polarization control LCD panel 7. FIG. 5 is a plan view of the polarization control LCD panel 7. FIG. 6 is a cross-sectional view at the line VI-VI of FIG. 5.

The polarization control LCD panel 7 includes an upper substrate 72, a lower substrate 71, and a liquid crystal layer 73 sandwiched between the substrates 71 and 72. Each of the substrates 71 and 72 comprises a light-transmissive material, such as glass or quartz. The liquid crystal layer 73 includes, for example, twisted nematic (TN) liquid crystal. On a surface of the upper substrate 72 near to the liquid crystal layer 73, upper electrodes 82 and 83 and an alignment layer 74 are arranged. Each of the upper electrodes 82 and 83 includes a transparent conductive layer comprising, for example, ITO. The alignment layer 74 controls the initial orientation of the liquid crystal layer 73.

Referring to FIG. 4, the upper electrodes 82 and 83 are two comb electrodes as viewed from a direction orthogonal to the directions F and G. The upper electrode 82 includes a connecting part 82b extending in the direction G and a plurality of strip electrode segments 82a extending from the connecting part 82b in parallel to one another in the direction F so as to cover the upper substrate 72. Similarly, the upper electrode 83 includes a connecting part 83b and a plurality of strip electrode segments 83a extending from the connecting part 83b in parallel to one another in the direction F so as to cover the upper substrate 72. The connecting parts 82b and 83b are arranged in parallel to each other outside a region in the upper substrate 72, the region corresponding to a pixel array area 2c of the display panel 2.

As viewed from the direction orthogonal to the directions F and G, the strip electrode segments 82a and 83a are arranged over the region in the upper substrate 72 corresponding to the pixel array area 2c so as to extend in the longitudinal direction (direction F). The strip electrode segments 82a are arranged at a pitch 2W, which is twice as long as the pitch W for the arrangement of the unit areas 7c, in the lateral direction (direction G) over the region in the upper substrate 72 corresponding to the pixel array area 2c of the display panel 2, as viewed from the direction orthogonal to the directions F and G. Similarly, the upper electrode segments 83a are arranged at the pitch 2W in the direction G over the region corresponding to the pixel array area 2c. The upper electrodes 82 and 83 are arranged so as to engage with each other without overlapping the strip electrode segments 82a and 83a.

In other words, the strip electrode segments 82a and 83a extending in the direction F are alternately arranged at the pitch W in the direction G in the region in the upper substrate 72 corresponding to the pixel array area 2c of the display panel 2.

On the other hand, a lower electrode 81 is arranged over a region in the lower substrate 71 as viewed from the direction orthogonal to the directions F and G, the region covering the pixel array area 2c of the display panel 2.

Referring to FIG. 3, each unit area 7c of the polarization control LCD panel 7 is an area where either the strip electrode segment 82a of the upper electrode 82 or the upper electrode segment 83a of the upper electrode 83 is superposed above the lower electrode 81. In other words, the orientation of the liquid crystal layer 73 is defined by the potential difference between each of the strip electrode segments 82a and 83a and the corresponding part of the lower electrode 81, thus forming the polarization control areas 7a and 7b of the polarization control LCD panel 7.

In this embodiment, when the upper electrode 82 or 83 and the lower electrode 81 in a certain unit area 7c provide a sufficient potential difference therebetween, the area serves as the polarization control area 7a for transmitting light having the first polarization axis. If the upper electrode 82 or 83 and the lower electrode 81 in the certain unit area 7c have no potential difference therebetween, the area serves as the polarization control area 7b for converting light having the first polarization axis to light having the second polarization axis that is substantially orthogonal to the first polarization axis.

Figure 7:
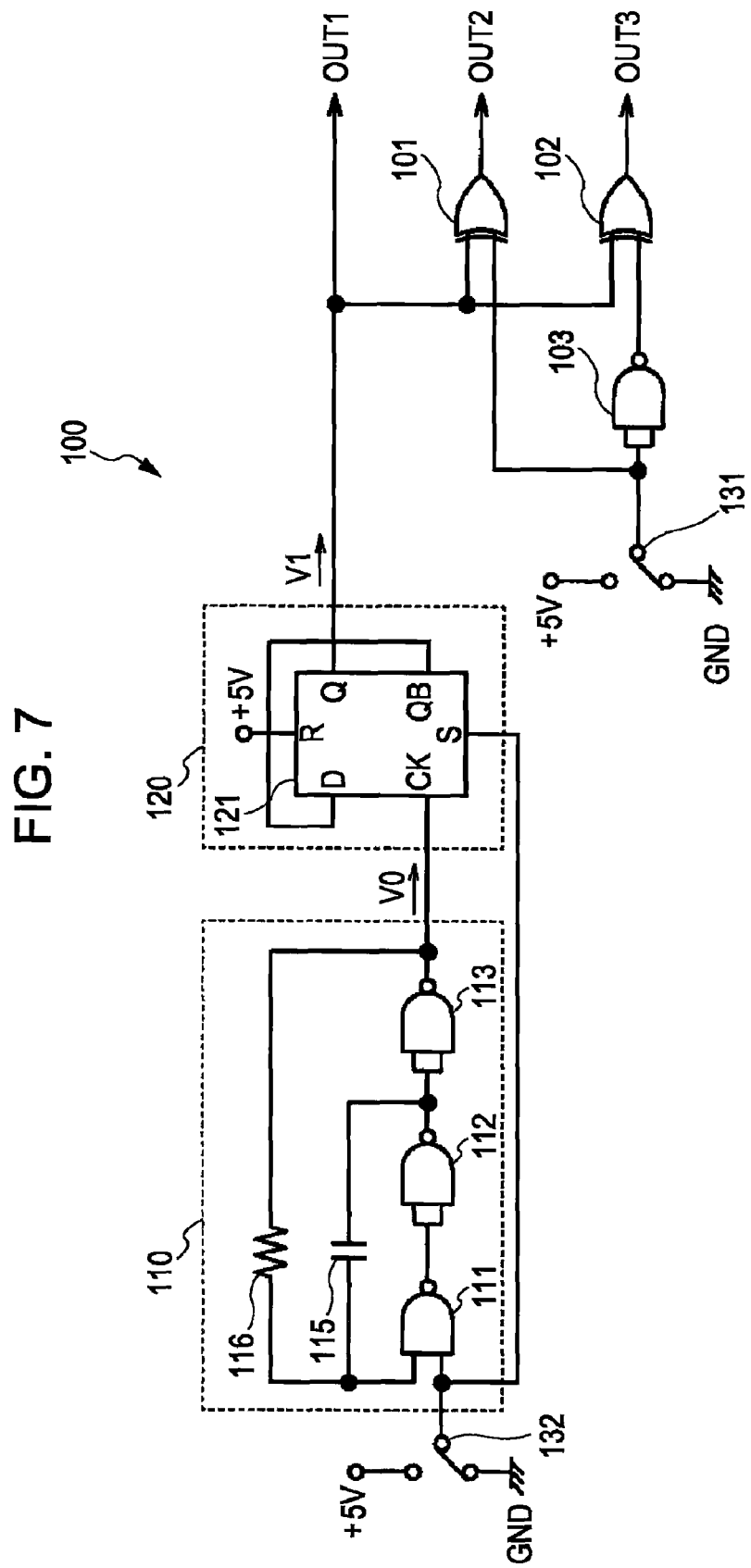
FIG. 7 is an electrical diagram of a driving circuit.

The potential difference between the upper electrode 82 or 83 and the lower electrode 81 is determined by voltages applied to the opposed electrodes. The voltages applied to the respective electrodes are controlled by the driving circuit 100, which will be described below. FIG. 7 is an electrical diagram of the driving circuit 100.

The driving circuit 100 includes an oscillator circuit 110, a frequency divider circuit 120, XOR circuits 101 and 102, a NAND circuit 103, and switches 131 and 132. The driving circuit 100 further includes output terminals OUT1, OUT2, and OUT3. The output terminals OUT1 to OUT3 are connected to the lower electrode 81 and the upper electrodes 82 and 83, respectively.

The switches 131 and 132 each have two input terminals. The two input terminals are connected to a power supply voltage of +5 V and ground potential GND, respectively. An output terminal of the switch 132 is connected to the oscillator circuit 110. An output terminal of the switch 131 is connected to one input terminal of the XOR circuit 101 and both input terminals of the NAND circuit 103. The switches 131 and 132 are connected to the controller 30. In response to a switching signal from the controller 30, one of the two input terminals of each switch is selectively connected to the output terminal thereof.

The oscillator circuit 110 is a CR oscillator and includes NAND circuits 111, 112, and 113, a capacitor 115, and a resistor 116. The power supply voltage of +5 V is applied from the output terminal of the switch 132 to the NAND circuit 111, so that the CR oscillator circuit 110 outputs a clock signal V0.

The frequency divider circuit 120 includes a D-type flip-flop (hereinafter, referred to as a DFF) 121. A clock input terminal CK of the DFF 121 is connected to an output of the oscillator circuit 110. An inverted output terminal QB of the DFF 121 is connected to an input terminal D thereof. The DFF 121 outputs a clock signal V1 from an output terminal Q, the clock signal V1 having a frequency that is half the frequency of the clock signal V0 supplied from the oscillator circuit 110. The frequency divider circuit 120 divides the frequency of the clock signal V0 in half to obtain the clock signal V1 having a rectangular wave whose duty ratio is 50%

The output terminal Q of the DFF 121 is connected to the output terminal OUT1, the other input terminal of the XOR circuit 101, and one input terminal of the XOR circuit 102. An output terminal of the NAND circuit 103 is connected to the other input terminal of the XOR circuit 102. Output terminals of the XOR circuits 101 and 102 are connected to the output terminals OUT2 and OUT3, respectively.

Figure 8A:
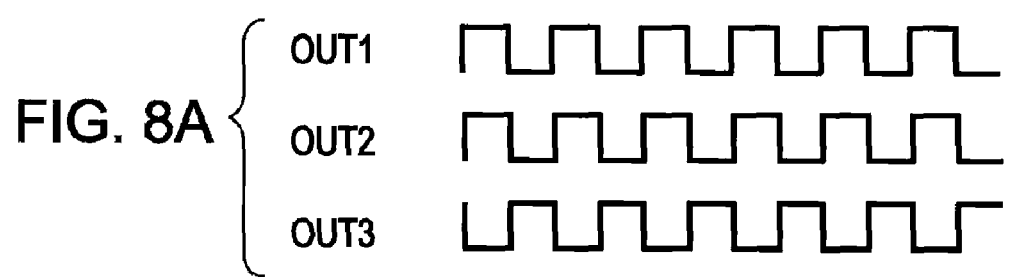
FIGS. 8A and 8B are timing charts explaining voltages output from the driving circuit.
Figure 8B:
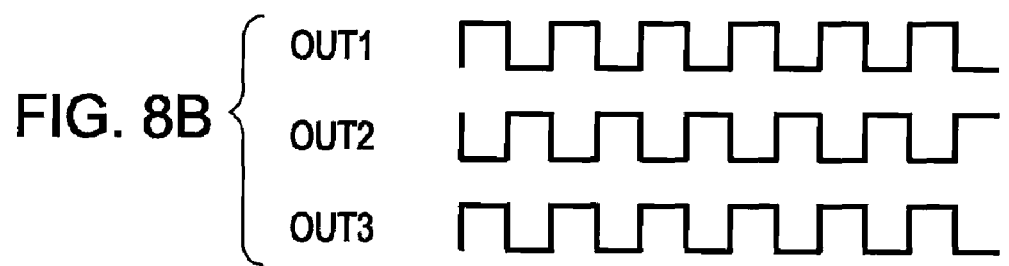

The operation of the driving circuit 100 and waveforms of voltages output from the driving circuit 100 to the lower electrode 81 and the upper electrodes 82 and 83 will now be described. FIGS. 8A and 8B are timing charts for explaining waveforms of voltages output from the output terminals OUT1 to OUT3 of the driving circuit 100.

In the first dual-view display mode, in response to a switching signal from the controller 30, the input terminal of the switch 131 is connected to the ground potential GND and the input terminal of the switch 132 is connected to the power supply voltage of +5 V. As shown in FIG. 8A, therefore, the output terminals OUT1 and OUT2 each output the clock signal V1 which is output from the output terminal Q of the DFF 121. On the other hand, the output terminal OUT3 outputs a signal obtained by inverting the clock signal V1 through the XOR circuit 102.

In the second dual-view display mode, in response to a switching signal from the controller 30, the input terminals of the switches 131 and 132 are connected to the power supply voltage of +5 V. As shown in FIG. 8B, therefore, the output terminals OUT1 and OUT3 each output the clock signal V1 which is output from the output terminal Q of the DFF 121. On the other hand, the output terminal OUT2 outputs a signal obtained by inverting the clock signal V1 through the XOR circuit 101.

In other words, the driving circuit 100 applies the voltages to the upper electrodes 82 and 83 such that the adjacent strip electrode segments 82a and 83a of the upper electrodes 82 and 83 are applied with voltages opposite in phase, and applies the voltage, which is in phase with one of the voltages applied to the upper electrodes 82 and 83, to the lower electrode 81. In the first dual-view display mode, a potential difference exists between each upper electrode segment 83a and the lower electrode 81. In the second dual-view display mode, a potential difference exists between each strip electrode segment 82a and the lower electrode 81. The polarization control areas 7a and 7b are alternately arranged in the polarization control LCD panel 7. The positions of the polarization control areas 7a and 7b each serving as the unit area 7c are reversed between the first and second dual-view display modes.

Figure 11A:
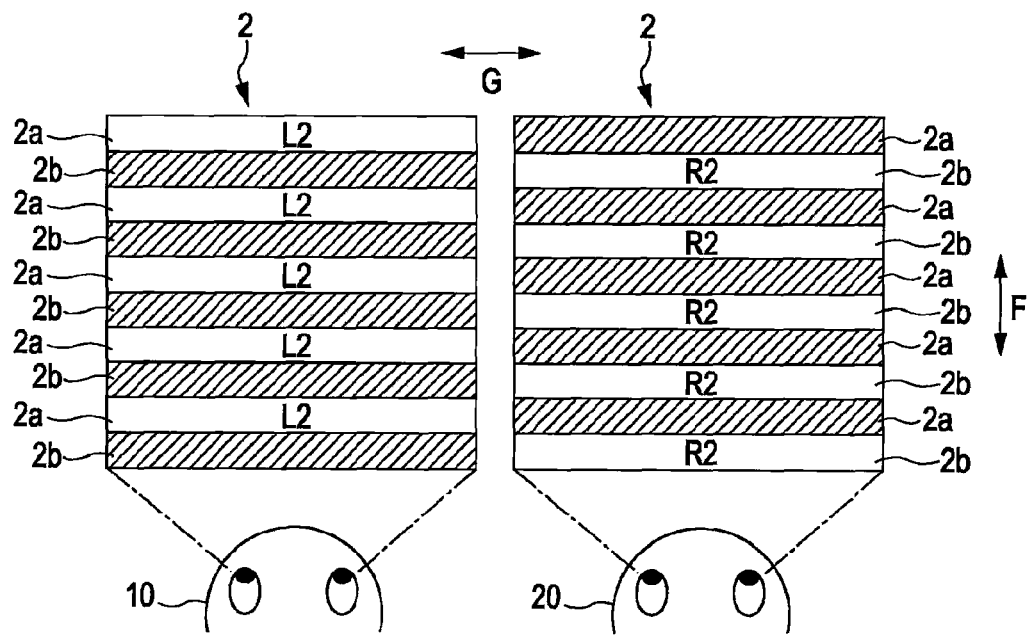
FIGS. 11A and 11B are diagrams explaining areas of the display panel viewed by the respective viewers in dual-view display modes of the image display.
Figure 11B:
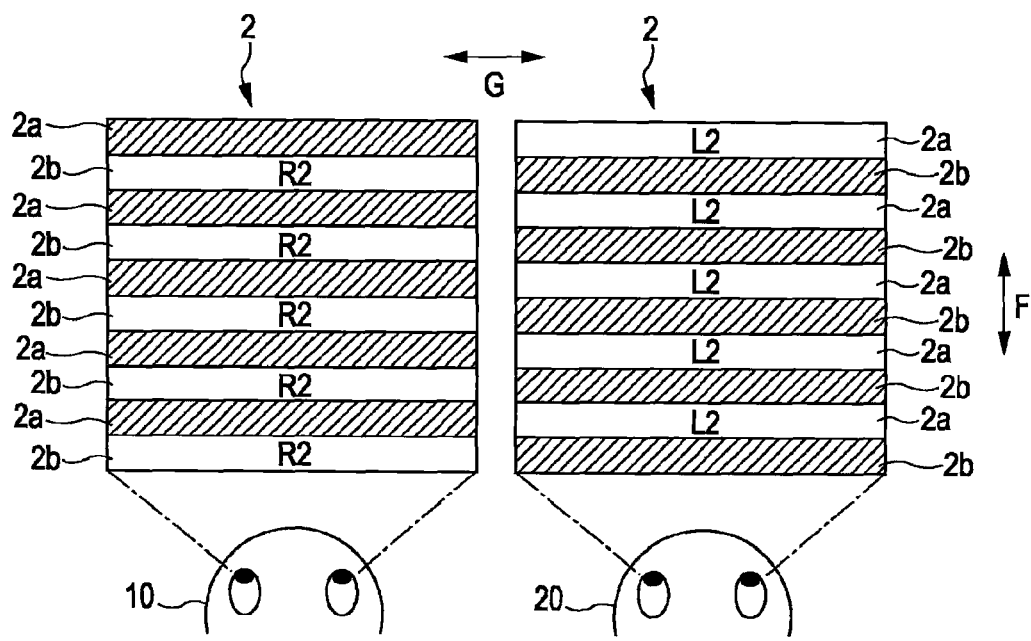

The operation of the image display 1 according to the embodiment of the invention will be described in detail below. The operation thereof in the first dual-view display mode will now be described with reference to FIGS. 2A and 2B and 9 to 11B. FIGS. 11A and 11B are diagrams explaining areas of the display panel viewed by the viewers in the respective dual-view display modes of the image display 1 shown in FIG. 1.

First Dual-View Display Mode

The controller 30 supplies image signals to the display panel 2 to display images. In this instance, the controller 30 supplies two image signals for the image L2 (for example, for a television receiver) and the image R2 (for example, for a car navigation system). In this embodiment, as shown in FIGS. 10A and 10B, the image L2 is displayed in the pixel rows 2a of the display panel 2 and the image R2 is displayed in the pixel rows 2b thereof in the first and second dual-view display modes. When the controller 30 supplies the image signals to the display panel 2 only after starting the image display 1, the controller 30 simultaneously outputs a switching signal to the driving circuit 100 so that the driving circuit 100 enters the first dual-view display mode. In other words, the image display 1 according to this embodiment enters the first dual-view display mode every time the image display 1 is started.

In the first dual-view display mode, as for light emitted from the backlight 5, the polarizer 6 disposed on the backlight 5 near to the viewers 10 and 20 allows only light having the first polarization axis to pass therethrough to the polarization control LCD panel 7. The light having the first polarization axis passes through the polarization control areas 7a and 7b of the polarization control LCD panel 7. In this instance, the light incident on the polarization control areas 7a of the polarization control LCD panel 7 passes therethrough such that the polarization axis is not changed. On the other hand, the light incident on the polarization control areas 7b passes therethrough such that the polarization axis is changed by substantially 90° (i.e., the light has the second polarization axis). After that, as shown in FIG. 2A, the light passing through the polarization control areas 7a and having the first polarization axis is focused so as to travel to the viewer 10 by the lenticular lens 8. The light passing through the polarization control areas 7b and having the second polarization axis substantially orthogonal to the first polarization axis is focused so as to travel to the viewer 20 by the lenticular lens 8.

Referring to FIG. 10A, the light having the first polarization axis and traveling to the viewer 10 enters the retardation film 9 having the transmitting areas 9a and the polarizing areas 9b. The light having the first polarization axis passes through the transmitting areas 9a and the polarizing areas 9b of the retardation film 9. In this instance, the light incident on the transmitting areas 9a of the retardation film 9 passes therethrough such that the polarization axis is not changed. The light incident on the polarizing areas 9b passes therethrough such that the polarization axis is changed by substantially 90° (i.e., the light has the second polarization axis). After that, the light passing through the transmitting areas 9a of the retardation film 9 while having the first polarization axis and traveling to the viewer 10 enters the polarizer 4 arranged between the retardation film 9 and the display panel 2. The light passes through the polarizer 4 and then enters the pixel rows 2a of the display panel 2. On the other hand, the light passing through the polarizing areas 9b of the retardation film 9 such that the light has the second polarization axis and traveling to the viewer 10 enters the polarizer 4 disposed between the retardation film 9 and the display panel 2, so that the light is absorbed by the polarizer 4. Accordingly, the light to pass through the pixel rows 2b of the display panel 2 where the image R2 is displayed does not reach the viewer 10. Thus, the viewer 10 cannot view the image R2 displayed in the pixel rows 2b of the display panel 2. Referring to FIG. 11A, the viewer 10 can view only the image L2 displayed in the pixel rows 2a of the display panel 2.

As shown in FIG. 10A, the light traveling to the viewer 20 while having the second polarization axis enters the retardation film 9 having the transmitting areas 9a and the polarizing areas 9b. Then, the light having the second polarization axis substantially orthogonal to the first polarization axis passes through the transmitting areas 9a and the polarizing areas 9b of the retardation film 9. In this instance, the light incident on the transmitting areas 9a passes therethrough such that the polarization axis is not changed. The light incident on the polarizing areas 9b passes therethrough such that the polarization axis is changed by substantially 90° (i.e., the light has the first polarization axis). After that, the light, which passes through the transmitting areas 9a while having the second polarization axis and travels to the viewer 20, enters the polarizer 4 arranged between the retardation film 9 and the display panel 2, so that the light is absorbed by the retardation film 9. Accordingly, the light to pass through the pixel rows 2a of the display panel 2 where the image L2 is displayed does not reach the viewer 20. Thus, the viewer 20 cannot view the image L2 displayed in the pixel rows 2a of the display panel 2. On the other hand, the light passing through the polarizing areas 9b such that the light has the first polarization axis and traveling to the viewer 20 enters the polarizer 4 disposed between the retardation film 9 and the display panel 2. The light passes through the polarizer 4 and enters the pixel rows 2b of the display panel 2. Consequently, the viewer 20 can view only the image R2 displayed in the pixel rows 2b of the display panel 2 as shown in FIG. 11A.

Second Dual-View Display Mode

When the viewer 10 or 20 operates the display mode selector switch in the first dual-view display mode, the mode of the image display 1 is switched to the second dual-view display mode. In other words, the controller 30 transmits a switching signal to the driving circuit 100 so that the driving circuit 100 enters the second dual-view display mode. In this instance, the image signals supplied from the controller 30 to the display panel 2 are the same as those of the first dual-view display mode.

In the second dual-view display mode, as for light emitted from the backlight 5, the polarizer 6 disposed on the backlight 5 near to the viewers 10 and 20 allows only light having the first polarization axis to pass therethrough to the polarization control LCD panel 7. The light having the first polarization axis passes through the polarization control areas 7a and 7b of the polarization control LCD panel 7. In this instance, the light incident on the polarization control areas 7a passes therethrough such that the polarization axis is not changed. On the other hand, the light incident on the polarization control areas 7b passes therethrough such that the polarization axis is changed by substantially 90° (i.e., the light has the second polarization axis). After that, as shown in FIG. 2B, the light passing through the polarization control areas 7a while having the first polarization axis is focused so as to travel to the viewer 20 by the lenticular lens 8. The light passing through the polarization control areas 7b such that the light has the second polarization axis substantially orthogonal to the first polarization axis is focused so as to travel to the viewer 10 by the lenticular lens 8.

Referring to FIG. 10B, the light traveling to the viewer 20 while having the first polarization axis enters the retardation film 9 having the transmitting areas 9a and the polarizing areas 9b. The light having the first polarization axis passes through the transmitting areas 9a and the polarizing areas 9b of the retardation film 9. In this instance, the light incident on the transmitting areas 9a passes therethrough such that the polarization axis is not changed. The light incident on the polarizing areas 9b passes therethrough such that the polarization axis is changed by substantially 90° (i.e., the light has the second polarization axis). After that, the light, which passes through the transmitting areas 9a while having the first polarization axis and travels to the viewer 20, enters the polarizer 4 arranged between the retardation film 9 and the display panel 2. The light passes through the polarizer 4 and then enters the pixel rows 2a of the display panel 2. On the other hand, the light, which passes through the polarizing areas 9b such that the light has the second polarization axis and travels to the viewer 20, enters the polarizer 4 disposed between the retardation film 9 and the display panel 2, so that the light is absorbed by the polarizer 4. Accordingly, the light to pass through the pixel rows 2b of the display panel 2 where the image R2 is displayed does not reach the viewer 20. Thus, the viewer 20 cannot view the image R2 displayed in the pixel rows 2b of the display panel 2. Referring to FIG. 11B, the viewer 20 can view only the image L2 displayed in the pixel rows 2a of the display panel 2.

As shown in FIG. 10B, the light traveling to the viewer 10 while having the second polarization axis enters the retardation film 9 having the transmitting areas 9a and the polarizing areas 9b. Then, the light having the second polarization axis substantially orthogonal to the first polarization axis passes through the transmitting areas 9a and the polarizing areas 9b of the retardation film 9. In this instance, the light incident on the transmitting areas 9a passes therethrough such that the polarization axis is not changed. The light incident on the polarizing areas 9b passes therethrough such that the polarization axis is changed by substantially 90° (i.e., the light has the first polarization axis). After that, the light, which passes through the transmitting areas 9a while having the second polarization axis and travels to the viewer 10, enters the polarizer 4 arranged between the retardation film 9 and the display panel 2, so that the light is absorbed by the polarizer 4. Accordingly, the light to pass through the pixel rows 2a of the display panel 2 where the image L2 is displayed does not reach the viewer 10. Thus, the viewer 10 cannot view the image L2 displayed in the pixel rows 2a of the display panel 2. On the other hand, the light, which passes through the polarizing areas 9b such that the light has the first polarization axis and travels to the viewer 10, enters the polarizer 4 disposed between the retardation film 9 and the display panel 2. The light passes through the polarizer 4 and enters the pixel rows 2b of the display panel 2. Consequently, the viewer 10 can view only the image R2 displayed in the pixel rows 2b of the display panel 2 as shown in FIG. 11B.

When the viewer 10 or 20 operates the display mode selector switch in the second dual-view display mode, the image display 1 is returned to the first dual-view display mode.

The image display 1 according to this embodiment has the following advantages.

According to the embodiment, the image display 1 includes the lenticular lens 8 for allowing lights having different polarization axes separated through the polarization control LCD panel 7 to travel in respective predetermined directions. Accordingly, lights traveling to the viewers 10 and 20 are not blocked unlike in the case where light coming from the display panel 2 is allowed to pass through a member for restricting the light so that the light travels in a direction defined by a predetermined angle. Advantageously, the intensities of lights traveling to the viewers 10 and 20 can be prevented from decreasing. Consequently, images can be prevented from appearing dark.

In the image display 1, the polarization control LCD panel 7 for separating light emitted from the backlight 5 through the polarizer 6 into light having the first polarization axis and light having the second polarization axis substantially orthogonal to the first polarization axis is disposed between the backlight 5 and the display panel 2. In addition, the lenticular lens 8 for allowing the lights having the different polarization axes separated through the polarization control LCD panel 7 to travel in different predetermined directions is arranged between the polarization control LCD panel 7 and the display panel 2. Consequently, the light emitted from the backlight 5 can be separated so as to travel to the viewers 10 and 20 in different viewing positions before the light enters the display panel 2. In a known dual-view display using a parallax barrier, in the use of a high-definition display panel with a small pixel pitch, disadvantageously, the distance between two viewers cannot be widened because of the positional relationship between the parallax barrier and pixels. According to the embodiment of the invention, if the image display 1 includes a high-definition display panel 2 with a small pixel pitch, lights travel to the viewers 10 and 20 irrespective of the pixel pitch of the display panel 2. Advantageously, different high-definition images can be provided to the viewers 10 and 20 in the different viewing positions.

In the known dual-view display with the parallax barrier for presenting different images L2 and R2 to the respective viewers 10 and 20 in different viewing positions, the images L2 and R2 have to be interchanged in order to present the images R2 and L2 to the viewers 10 and 20, respectively. Therefore, input data of the images L2 and R2 has to be rendered to generate new image signals each time the images L2 and R2 are interchanged. Unfortunately, the known dual-view display requires time for re-rendering each time the directions of displaying the images L2 and R2 are interchanged, causing a delay in image display. To eliminate the delay in image display, the display has to be equipped with a memory, leading to an increase in the cost of the display.

According to the embodiment of the invention, the image display 1 can interchange the images provided to the viewers 10 and 20 in different viewing positions without changing the positions of display portions for the images L2 and R2. Advantageously, a delay in image display is not caused during interchanging the images.

The upper electrodes 82 and 83 of the polarization control LCD panel 7 are comb-shaped and are engaged with each other on the upper substrate 72 such that the strip electrode segments 82a and 83a are alternately arranged. The lower electrode 81 is arranged so as to cover the region in the lower substrate 71 corresponding to the pixel array area 2c. Accordingly, two electrodes, serving as the upper electrodes, applied with different voltages can be formed by a single conductive layer on a substrate. The polarization control LCD panel 7 can be easily formed at a low cost.

In addition, since the driving circuit 100 controlling the polarization control LCD panel 7 is composed of known simple electric circuits, such as the oscillator circuit 110, the frequency divider circuit 120, and the logic circuits, the driving circuit 100 can be readily formed at a low cost.

The image display 1 in accordance with the embodiment has the two display modes, i.e., the first and second dual-view display modes. The image display 1 may further have a two-dimensional image display mode. In the two-dimensional image display mode, the image display 1 presents the same image to the viewers 10 and 20 in different viewing positions. In this mode, the controller 30 supplies image signals to the display panel 2 so that the pixel rows 2a and 2b of the display panel 2 display the same image. In the second dual-view display mode, the viewer 10 or 20 can switch the mode to the two-dimensional image display mode by operating the display mode selector switch.

In the embodiment, the first and second dual-view display modes of the image display 1 can be switched therebetween by operating the display mode selector switch through the viewer 10 or 20. The display mode switching is not intended to be limiting. For example, data of the images L2 and R2 supplied to the image display 1 may include display-mode switching information. The controller 30 may output a switching signal in accordance with the display-mode switching information so that the display mode of the image display 1 is switched to the other one. Alternatively, a timer may be used so that the display mode of the image display 1 is sequentially switched to the other one every predetermined time.

An example of an electronic device to which the image display according to the invention can be applied will now be described with reference to FIG. 12.

In this example, the image display according to the invention is applied to a display of a mobile phone. FIG. 12 is a perspective view of a mobile phone. Referring to FIG. 12, a mobile phone 200 includes a plurality of operation buttons 201, an earpiece 202, a mouthpiece 203, and a display 204 to which the image display according to the invention is applied.

Figure 12:
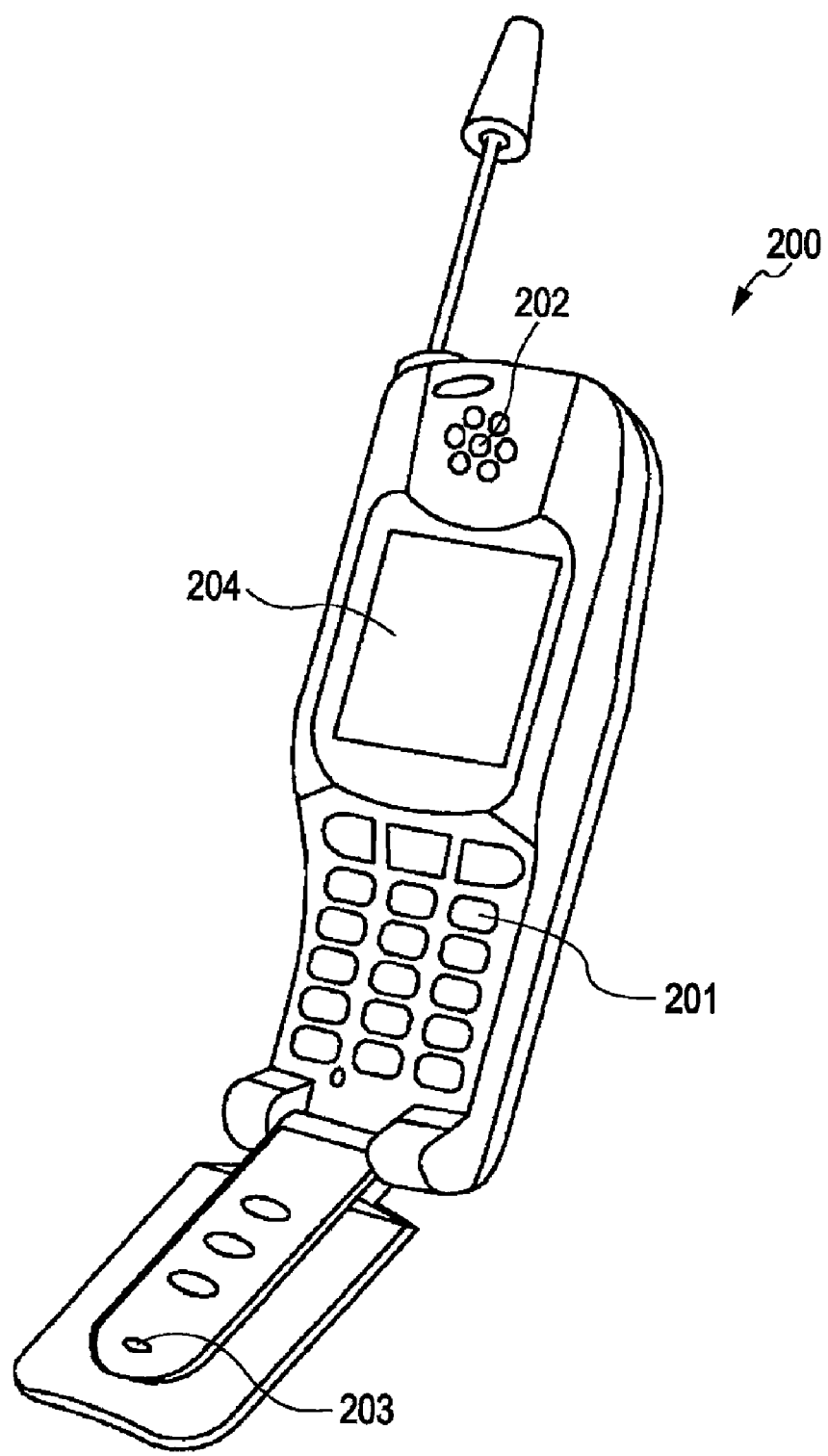
FIG. 12 is a perspective view of a mobile phone.

In addition to the mobile phone shown in FIG. 12, the image display according to the invention is suitably applicable to electronic devices, e.g., a personal computer, a liquid crystal television, view-finder type and monitor-direct-view type video tape recorders, a car navigation system, a pager, an electronic organizer, an electronic calculator, a word processor, a workstation, a videophone, a POS terminal, and a digital still camera.

It should be understood that the invention is not limited to the above-described embodiments and various changes and modifications thereof could be made without departing from the spirit or scope of the invention as defined in the appended claims and as described in the specification.

The entire disclosure of Japanese Patent Application No. 2006-011304, filed Jan. 19, 2006 is expressly incorporated by reference herein.

What is claimed is:

1. An image display comprising:
   a display panel having a plurality of pixels arrayed in a first direction and a second direction intersecting the first direction;
   a light source that emits light toward the display panel;
   a polarization-axis control unit disposed between the display panel and the light source, the polarization-axis control unit separating the light emitted from the light source into light having a first polarization axis and light having a second polarization axis different from the first polarization axis; and
   an optical element arranged between the display panel and the polarization-axis control unit, the optical element allowing the light emitted from the light source to travel in a direction substantially orthogonal to the first direction, wherein
   the polarization-axis control unit includes:
   a first substrate;
   a second substrate;
   a liquid crystal layer sandwiched between the first and second substrates;
   a first electrode having a first connecting part and a first plurality of strip electrode segments extending from the first connecting part in the first direction arranged at a predetermined pitch in the second direction on the first substrate;
   a second electrode having a second connecting part and a second plurality of strip electrode segments extending from the second connecting part in the first direction arranged at a predetermined pitch in the second direction on the first substrate; and a third electrode on the second substrate, the first electrode and the second electrode arranged with the first connecting part and the second connecting part each in opposite end portions of the first substrate, and the first plurality of strip electrode segments and the second plurality of strip electrode segments extending from the first connecting part and the second connecting part in opposite directions and alternately arranged over a surface of the first substrate, and the first electrode and the second electrode are arranged separately and without overlapping, and are electrically driven separately, and the third electrode being superposed over the first electrode and second electrode in a region corresponding to a pixel array area of the display panel.

2. The image display according to claim 1, further comprising:

a controller that controls voltages applied to the first electrode and the second electrode to switch an image display mode of the image display between a first dual-view display mode and a second dual-view display mode.

3. The image display according to claim 2, wherein in the first dual-view display mode, the controller applies the voltages to the first electrode and second electrode so that the adjacent strip electrode segments of the respective first plurality of strip electrode segments and second plurality of strip electrode segments are opposite in phase and the third electrode is applied with the voltage having the same phase as that of the voltage applied to the first electrode, and in the second dual-view display mode, the controller applies the voltages to the first electrode and the second electrode so that the adjacent strip electrode segments of the respective first plurality of strip electrode segments and second plurality of strip electrode segments are opposite in phase and the third electrode is applied with the voltage having the same phase as that of the voltage applied to the second electrode.

4. An electronic device having the image display according to claim 1.

* * * * *